Patented May 2, 1933

1,906,224

UNITED STATES PATENT OFFICE

ALEXANDER HUGH DEWAR, OF BLACKHEATH PARK, ENGLAND

MANUFACTURE OF MATERIALS SUITABLE FOR FLOOR COVERINGS AND FOR OTHER PURPOSES

No Drawing. Application filed May 11, 1931, Serial No. 536,680, and in Great Britain January 6, 1931.

The present invention relates to the manufacture of materials of the kind that are suitable for purposes such as those for which linoleum is applicable, such as floor coverings and the like, or for articles made by moulding under pressure.

Linoleum is essentially manufactured from oxidized or polymerized siccative oils, such as linseed oil, with or without certain resins, and granulated cork, wood meal or flour or the like, an addition of pigment also being made when required. The said ingredients are mixed and kneaded together and then the mixture is consolidated by pressure and heat. In all cases the oil employed is not in a complete state of oxidation but in such a tate that the materials will readily mix, work, knit and consolidate together and the success of the process depends upon such an incomplete state of oxidation of the oil or of what is generally known as linoleum cement, that is the composition comprising oxidized linseed oil and resins. It is essential, however, that as the consolidated product contains incompletely oxidized oil or linoleum cement it should go through a further or complementary stage or process of oxidation to render it sufficiently hard to be commercial and serviceable. This further or complementary stage or process of oxidation is necessarily carried out after the product of the mixing and kneading operation has been consolidated. The said further stage or process of oxidation is usually referred to as seasoning, curing, or maturing, and is hereinafter referred to as seasoning. The seasoning stage or process has usually been carried out in a warm stove and is expensive, as it takes a considerable time (several days or weeks according to circumstances), the stove apparatus is very large for sheet linoleum and expensive to erect, and considerable fuel is used.

A covering material is known which is manufactured essentially from ingredients ordinarily employed in linoleum manufacture, namely oxidized oil or linoleum cement, and wood meal, together with nitro-cellulose and tri-cresyl phosphate, the tri-cresyl phosphate acting as a plasticizer, gelatinizer or softener of the nitro-cellulose, and without the use of volatile solvents. After the mixture is rendered homogeneous on hot rollers, it is powdered and then consolidated under high pressure and heat. The product thereby obtained is essentially a combination of linoleum material and nitro-cellulose, and as the consolidation is carried out while the oxidized oil or linoleum cement is still in an incompletely oxidized or unseasoned condition the consolidated material must be seasoned in the same manner as ordinary linoleum, although the nitro-cellulose does not need or involve such a treatment but on the contrary is deleteriously affected by it.

The present invention provides a novel product of the class hereinbefore referred to and a process of manufacturing such product which consists essentially in combining fully pre-seasoned particles of linoleum composition with a cellulose ester plastic and consolidating the mixture by heat and pressure. More particularly, the process of the invention involves: first, preparing such pre-seasoned linoleum composition (i. e., a mixture of oxidized oil and filler media) in a finely divided state and in such a highly oxidized and dry condition that the particles no longer cohere when rolled as in the ordinary course of linoleum manufacture; secondly, admixing a cellulose ester plastic with such particles; and thirdly, consolidating the mixture by pressure and heat. The specially prepared linoleum composition, defined by the expression "fully pre-seasoned" is characterized by being substantially drier and more uniformly oxidized than even ordinary sheeted and finished linoleum and, as produced, is entirely unusable in the manufacture of ordinary linoleum. The novel product of the invention possesses all of the properties of ordinary finished linoleum being characteristically hard and firm, yet pliant.

It will be observed that the process according to the present invention does away entirely with the expensive seasoning treatment of the consolidated product that has heretofore been necessary in the manufacture of the known covering materials previously mentioned. Further, as will be seen from what follows, the present process is also advantageous inasmuch as, if desired, the edgings trimmed from seasoned linoleum and the residual or scrap linoleum material resulting from the general manufacture of linoleum may also be utilized in the production of the improved material according to the present invention.

The following is a description by way of example of various methods of carrying the present invention into effect:—

In one method for the production of the particles or grains of linoleum in a seasoned condition the ingredients of the linoleum material (that is the ingredients ordinarily employed in linoleum manufacture such as an incompletely oxidized oil, resins—such for example as kauri gum—cork, wood meal or flour or the like) are mixed in the usual way, and the mixed material is finely scratched or shredded and passed through a disintegrator. The material in this finely divided state and whilst still warm is then very readily fully oxidized or seasoned by passing it together with air through long tubes into a cyclone collector and repeating the treatment as often as necessary. By such means the linoleum composition is brought to a fully seasoned state in a very short time (without danger of firing) by use of inexpensive apparatus compared with the long period and large stoves required for the usual seasoning heretofore required for heavily-calendered or sheeted linoleum.

Instead of seasoning particles of fresh linoleum material, the particles or grains of linoleum material in a fully pre-seasoned condition can also be prepared for the purpose of the present invention by disintegrating the edgings trimmed from finished linoleum and subjecting them, if necessary, to further oxidation to bring them to the requisite highly seasoned state. Furthermore in a general way in the manufacture of linoleum (particularly inlaid) there is also produced residual or scrap material which at the time of rejection is unseasoned but which, by lying-by, naturally in time becomes partly or wholly seasoned. This material also can be used for preparing the highly seasoned particles or grains of linoleum composition for the purpose of the present invention. If this residual or scrap material be in a fully seasoned condition prior to disintegration, the particles or grains resulting can be used without further treatment, but if the material be only in a partially seasoned condition, then it is brought to the requisite highly seasoned or dry state by further oxidizing or seasoning the particles or grains as previously described in connection with particles or grains of freshly mixed linoleum material.

The preferred cellulose ester used for the cellulose ester plastic is nitro-cellulose, but cellulose acetate may be used or any other cellulose ester which, having regard to the purpose in view, is suitable. For the making of the cellulose ester plastic it is necessary to embody with the cellulose ester a material to act as a plasticizer or solvent of it and to impart flexibility to the finished material. There are many plasticizers known which are suitable for use with cellulose esters. It has been proposed to use as plasticizers ethyl-abietate, normal propyl-abietate and other alkyl-abietates and esters. Di-butyl phthalate also gives good results, but all these organic esters are inflammable. While there is no limitation to the use of any particular plasticizers in the production of the cellulose ester plastic, it is preferred to use tri-cresyl phosphate or tri-phenyl phosphate or other esters of inorganic acids or plasticizers of which the acid radicals are inorganic acids, as they are mostly non-inflammable (tri-cresyl phosphate and tri-phenyl phosphate are non-inflammable) and therefore introduce a desirable feature in the finished material. Permanence of flexibility in the finished material is improved by the use of thick oil as an ingredient, and in most cases it is preferred in the manufacture of the material to use a proportion of such thick oil, castor oil or stand oil being preferred.

The term "cellulose ester plastic" as used throughout the specification and claims is intended to define a composition consisting of a cellulose ester and a plasticizer or plasticizers.

While to the particles or grains of linoleum material in a seasoned condition the cellulose ester, the plasticiser, and the oil may be added individually (in which case the plastic is formed at the same time as the said particles or grains are being incorporated therewith), it is preferred to incorporate the cellulose ester, the plasticiser and the oil together to form a plastic prior to admixture with the said seasoned particles or grains. As examples of good cellulose ester plastics for use in the present process there may be mentioned plastics produced by mixing:—

35 to 52 parts by weight of nitro-cellulose
50 to 37 parts by weight of tri-cresyl-phosphate
15 to 11 parts by weight of castor oil.

The particles or grains of linoleum material in a fully pre-seasoned condition and the other requisite ingredients are thoroughly mixed, as for instance by kneading machines, and the mixture consolidated by rolling out by hot pressure rollers on canvas or otherwise or moulded and pressed under heat. On cooling the material is finished and ready for use and needs no further seasoning.

It will be understood that the present invention does not depend on any particular way of producing the particles or grains of linoleum material in a seasoned condition, although it is essential that the particles or grains be in a fully pre-seasoned condition, or on the selection or methods of production of the cellulose ester plastic for incorporation therewith, or on particular proportions of the ingredients, but there are given below four examples of convenient proportions of suitable ingredients for a material according to the present invention:—

(1) To 720 parts by weight of fully pre-seasoned particles of fresh linoleum material are added 98 parts by weight of nitro-cellulose, 95 parts by weight of tri-cresyl phosphate, 30 parts by weight of castor oil, 72 parts by weight of pigment.

(2) To 700 parts by weight of particles of fully pre-seasoned linoleum edgings or scrap are added 200 parts by weight of a plastic made by incorporating 87 parts by weight of nitro-cellulose with 87 parts by weight of tri-cresyl phosphate and 26 parts by weight of castor oil, 100 parts by weight of pigment.

(3) To 350 parts by weight of fully pre-seasoned particles of fresh linoleum material are added 350 parts by weight of particles of fully pre-seasoned linoleum edgings or scrap, 214 parts by weight of a plastic made by incorporating 121 parts by weight of nitro-cellulose with 93 parts by weight of tri-cresyl phosphate, 86 parts by weight of pigment.

(4) To 350 parts by weight of fully-pre-seasoned particles of fresh linoleum material are added 340 parts by weight of fully pre-seasoned linoleum scrap, 212 parts by weight of a plastic made by incorporating 110 parts by weight of nitro-cellulose with 79 parts by weight of tri-cresyl phosphate and 23 parts by weight of castor oil, 98 parts by weight of pigment.

What I claim and desire to secure by Letters Patent of the United States is:—

1. A process for the manufacture of linoleum-like products which consists in combining a cellulose ester plastic with fully pre-seasoned linoleum composition comprising an oxidized oil and filler material, and consolidating said mixture with heat and pressure.

2. A process for the manufacture of linoleum-like products which consists in forming a mixture comprising an oxidized oil and filler material, fully seasoning said mixture, combining therewith a cellulose ester plastic and consolidating with heat and pressure.

3. A process for the manufacture of linoleum-like products which consists in forming in a finely divided state, a mixture comprising an oxidized oil and filler material, fully seasoning said mixture, combining therewith a cellulose ester plastic, and moulding under heat and pressure.

4. A process for the manufacture of linoleum-like products which consists in forming linoleum composition comprising oxidized oil and filler material, disintegrating said composition into a finely divided state, fully seasoning the linoleum composition while in such sub-divided state, admixing a cellulose ester plastic with said fully pre-seasoned linoleum composition, and moulding under heat and pressure.

5. A process for the manufacture of linoleum-like products which consists in forming linoleum composition comprising oxidized oil and filler material, disintegrating said composition into a finely divided state, aerating said disintegrated mixture to fully pre-season the linoleum composition, admixing a cellulose ester plastic with said fully pre-seasoned linoleum composition, and moulding under heat and pressure.

ALEXANDER HUGH DEWAR.